L. A. Beardsley,

*Excavator.*

No. 85,200.  Patented Dec. 22, 1868.

Witnesses:
J. Snowden Bell
W. P. Deming

Inventor:
L. A. Beardsley
By Knight Bro.
Attys

UNITED STATES PATENT OFFICE.

LEVI A. BEARDSLEY, OF FREDERICKSBURG, VIRGINIA.

IMPROVEMENT IN SELF-LOADING CARTS.

Specification forming part of Letters Patent No. 85,200, dated December 22, 1868.

*To all whom it may concern:*

Be it known that I, LEVI A. BEARDSLEY, of Fredericksburg, in the county of Spottsylvania and State of Virginia, have invented certain new and useful Improvements in Self-Loading Carts, of which the following is a full, clear, and exact description, reference being had to the acccompanying drawings, which make part of this specification, and in which—

Figure 1:
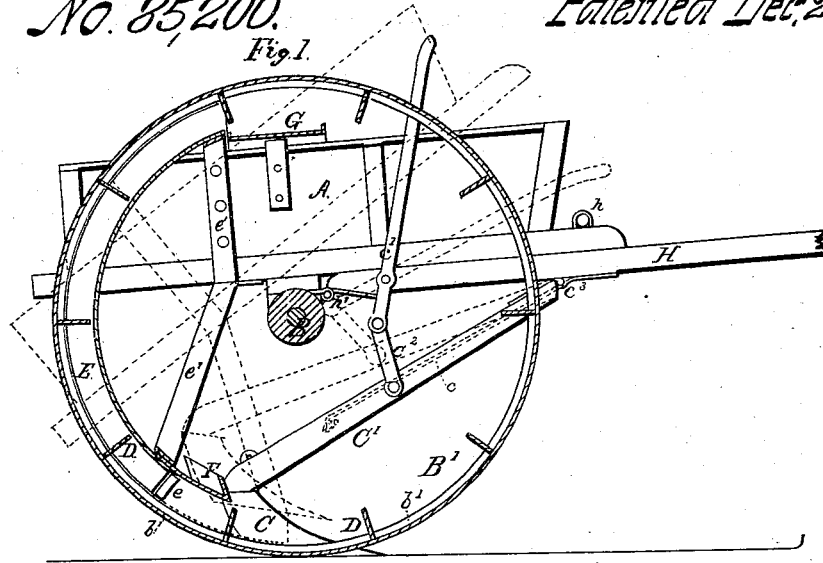
Figure 2:
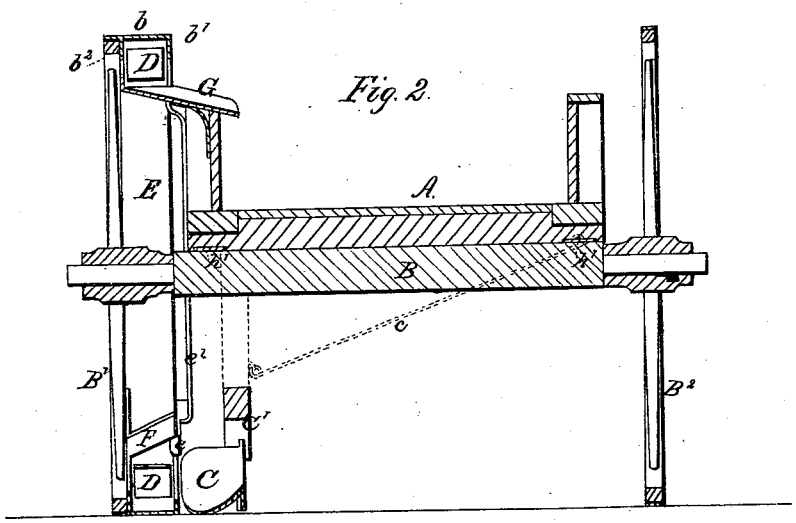

Figure 1 represents a vertical longitudinal section through one wheel of a cart to which my improvements are attached, the other wheel being removed to show the parts more clearly, and Fig. 2 a vertical transverse section through the axle of the cart, looking toward the rear thereof.

The subject of my invention is a cart having one of its wheels furnished with elevating-buckets working in a suitable channel-way, which is attached to the body of the cart, and so arranged as to allow of the latter being dumped, when desired, in the ordinary manner. A plow is arranged under the cart in such position as to throw the soil excavated by it into the buckets of the elevating-wheel, which deposit it in a chute, from which it drops into the cart.

A represents the body of the cart, which is supported upon an axle, B, carrying the wheels $B^1$ and $B^2$, and provided with shafts H for the attachment of a horse. An excavating-plow, C, attached to the lower end of an arm, C′, the opposite end of which is connected by hinges $c^3$ to the lower side of one of the shafts, is placed on the inner side of the wheel $B^1$, and in close proximity thereto, being suspended in proper position for excavating the soil when the cart is drawn forward, and suitably curved to throw the same into the wheel $B^1$. The rear end of the arm C′ is supported by the stay-rod $c$, (shown in the figures in dotted lines,) which connects it with the opposite shaft, and by the lever $c^1$, which is pivoted to the side of the shaft nearest the arm, and connected thereto by the pivoted link $c^2$. By pressing down this lever the plow can be raised from the ground when necessary, as shown in dotted lines in Fig. 1.

The wheel $B^1$, which adjoins the plow C, has a broad flat rim, $b$, provided with side flanges $b^1$ $b^2$, and having elevated buckets D arranged radially upon its inner side between the flanges $b^1$ and $b^2$.

A stationary channel-way, E, through which the elevating-buckets pass, is placed within the rim $b$, being curved concentrically therewith, and having its sides in line with the side flanges $b^1$ $b^2$ of the rim, there being merely sufficient space between them to allow the wheel $B^1$ to revolve freely. The channel-way E is attached to the body of the cart by the braces $e′$.

An inclined scraper, F, is attached to the lower end of the channel-way to remove any soil which may adhere to the tops of the buckets and cause it to drop into the spaces between them.

A small friction-roller, $e$, is placed at the lower end of E, against which the sides of the buckets will strike before striking the sides of the channel-way, and thus prevent shocks or breakage in case of disarrangement of the parts.

An inclined chute or spout, G, is attached to the body of the cart immediately beneath and in front of the upper end of the channel-way, into which the soil which is elevated by the buckets drops and falls into the cart.

The buckets D work as close as possible to the sides and bottom of the channel-way, having only sufficient clearance to enable them to pass freely.

The axle B of the cart is connected to the shafts by hinges $h′$, which arrangement, together with the concentricity of the channel-way E and rim $b$ of the wheel, enables the cart to be dumped when desired, in the ordinary manner, by removing the pin $h$. It is shown as dumped in dotted lines in Fig. 1.

The operation of the machine is as follows: The cart being drawn forward by a horse attached to the shafts H, the plow C excavates the soil and throws it into the rim $b$ of the wheel $B^1$, between the buckets D, which elevate it to the spout G, from which it drops into the body of the cart, thus obviating the manual labor of loading the same.

It will be seen that my improvement is readily applicable to carts or vehicles of ordinary construction, enabling the same to be fitted with it at trifling cost.

Having thus fully described my invention, what I claim therein as new, and desire to secure by Letters Patent, is—

The inclined scraper F and friction-roller e, in combination with the elevating-wheel $B^1$ D and channel-way E, substantially as and for the purpose set forth.

L. A. BEARDSLEY.

Witnesses:
CHAS. E. HUNTER,
GEO. W. HUNTER.